US011955915B2

United States Patent
Ji et al.

(10) Patent No.: US 11,955,915 B2
(45) Date of Patent: Apr. 9, 2024

(54) VARIABLE-FREQUENCY COMPRESSOR WITH ADAPTIVE HEATING POWER CONTROL AND METHOD FOR OPERATING THE SAME

(71) Applicant: Danfoss (Tianjin) Ltd., Tianjin (CN)

(72) Inventors: Shizhong Ji, Tianjin (CN); Wanzhen Liu, Tianjin (CN); Yingke Sun, Tianjin (CN); Li Yao, Tianjin (CN)

(73) Assignee: DANFOSS (TIANJIN) LTD., Tianjin (CN)

( * ) Notice: Subject to any disclaimer, the term of this patent is extended or adjusted under 35 U.S.C. 154(b) by 135 days.

(21) Appl. No.: 17/550,249

(22) Filed: Dec. 14, 2021

(65) Prior Publication Data

US 2022/0186730 A1 Jun. 16, 2022

(30) Foreign Application Priority Data

Dec. 14, 2020 (CN) .......................... 202011469533.6

(51) Int. Cl.
*H02P 29/64* (2016.01)
*F04C 18/356* (2006.01)
(Continued)

(52) U.S. Cl.
CPC .............. *H02P 29/64* (2016.02); *F04C 28/08* (2013.01); *F04C 28/24* (2013.01); *H02P 29/60* (2016.02); *F04C 18/356* (2013.01)

(58) Field of Classification Search
CPC .......... H02P 29/64; H02P 29/60; F04C 28/08; F04C 28/24; F04C 18/356; F04C 29/04;
(Continued)

(56) References Cited

U.S. PATENT DOCUMENTS 6,874,329 B2 * 4/2005 Stark ................. F25B 31/006
62/226
7,202,626 B2 * 4/2007 Jadric ..................... H02P 25/08
318/400.27
(Continued)

FOREIGN PATENT DOCUMENTS

| CN | 1129919 A | 8/1996 |
| CN | 1672317 A | 9/2005 |

(Continued)

OTHER PUBLICATIONS

First Examination Report for Indian Patent Application No. 202114058261 dated Jun. 21, 2022.

*Primary Examiner* — David Luo
(74) *Attorney, Agent, or Firm* — McCormick, Paulding & Huber PLLC

(57) ABSTRACT

The present disclosure provides a variable-frequency compressor with adaptive heating power control and a method for operating the same. According to an embodiment of the present disclosure, the variable-frequency compressor includes: a compression unit, for compressing a medium entering the variable-frequency compressor; a motor, including a stator and a rotor, for driving the compression unit; and a controller, configured to adaptively control a heating power of a winding of the stator according to information of the variable-frequency compressor.

24 Claims, 5 Drawing Sheets

(51) Int. Cl.
*F04C 28/08* (2006.01)
*F04C 28/24* (2006.01)
*H02P 29/60* (2016.01)

(58) Field of Classification Search
CPC .. F04C 29/0085; F04C 18/0207; F04C 23/02; F04C 29/02; F04B 2203/0202; F04B 2203/0205; F04B 35/04; F04B 39/06; F04B 49/06
USPC .......................................................... 318/11, 3
See application file for complete search history.

(56) References Cited

U.S. PATENT DOCUMENTS

| | | | |
|---|---|---|---|
| 8,601,828 B2 * | 12/2013 | Moseley | ................. F04B 49/10 62/229 |
| 2004/0237554 A1 | 12/2004 | Stark et al. | |
| 2010/0064703 A1 | 3/2010 | Senf, Jr. et al. | |
| 2015/0075205 A1 | 3/2015 | Ramayya | |

FOREIGN PATENT DOCUMENTS

| | | |
|---|---|---|
| CN | 102725600 A | 10/2012 |
| CN | 102761300 A | 10/2012 |
| CN | 103171448 A | 6/2013 |
| CN | 104389759 A | 3/2015 |
| CN | 106160615 A | 11/2016 |
| CN | 108768225 A | 11/2018 |
| CN | 110557075 A | 12/2019 |
| CN | 111376795 A | 7/2020 |
| EP | 2051024 A1 | 4/2009 |
| WO | 2004054085 A1 | 6/2004 |
| WO | 2011038176 A2 | 3/2011 |
| WO | 2014078527 A1 | 5/2014 |
| WO | 2015042166 A1 | 3/2015 |
| WO | 2019056072 A1 | 3/2019 |

* cited by examiner

VARIABLE-FREQUENCY COMPRESSOR WITH ADAPTIVE HEATING POWER CONTROL AND METHOD FOR OPERATING THE SAME

CROSS-REFERENCE TO RELATED APPLICATION

This application claims foreign priority benefits under 35 U.S.C. § 119 to Chinese Patent Application No. 202011469533.6 filed on Dec. 14, 2020, the content of which is hereby incorporated by reference in its entirety.

TECHNICAL FIELD

The present disclosure relates generally to the field of compressors, in particular, to a variable-frequency compressor with adaptive heating power control and a method for operating the same.

BACKGROUND

In order to control the temperature difference between an oil sump temperature of a compressor and an ambient temperature of the compressor, and to ensure effective oil dilution, a frequency converter of a variable-frequency compressor will provide a function of crankcase heating. The frequency converter injects a current into a stator coil to generate heat, for the purpose of evaporating liquid refrigerant and preventing excessive dilution of oil.

At present, a crankcase heating current parameter is built into the frequency converter of the compressor, and by adjusting this parameter, the current injected into the stator of the compressor can be adjusted, and the heating power of the crankcase can thereby be adjusted. However, the injection of a controllable current into the stator of the compressor cannot produce a controllable heating power. The frequency converter will inject a current into each phase according to present rotor position information, and different rotor positions will have different phase current combinations even if the amplitude of the phase current is always a same setting value. Thus, an uncertain heating amount will be generated by this function.

SUMMARY

In view of the above, the present disclosure is at least partly to provide a variable-frequency compressor with adaptive heating power control and a method for operating same.

According to one aspect of the present disclosure, a variable-frequency compressor is provided, including: a compression unit, for compressing a medium entering the variable-frequency compressor; a motor, including a stator and a rotor, for driving the compression unit; and a controller, configured to adaptively control a heating power of a winding of the stator according to information of the variable-frequency compressor.

According to an embodiment of the present disclosure, the controller may be configured to: control the heating power of the winding of the stator according to a position of the rotor.

According to an embodiment of the present disclosure, the controller may be configured to: control the heating power of the winding of the stator according to a phase resistance of the winding of the stator.

According to an embodiment of the present disclosure, the controller may be configured to: control the heating power of the winding of the stator according to a phase resistance of the winding of the stator and a position of the rotor.

According to an embodiment of the present disclosure, the controller may be configured to detect the position of the rotor and adjust amplitude of a current injected into the winding of the stator according to the position of the rotor, such that the heating power of the winding is a desired heating power.

According to an embodiment of the present disclosure, the controller may be configured to forcibly position the rotor if the rotor position is adjustable, such that amplitude of a current injected into the winding of the stator causes the heating power of the winding to be a desired heating power.

According to an embodiment of the present disclosure, the controller may be configured to forcibly position the rotor in a predetermined position and inject a current into the winding of the stator according to a heating current parameter corresponding to the predetermined position, such that the heating power of the winding is a desired heating power.

According to an embodiment of the present disclosure, the controller may be configured to forcibly position the rotor in a position that causes a current flowing through a winding at one phase in the stator to be substantially zero.

According to an embodiment of the present disclosure, the controller may be configured to: detect a current flowing through windings of two phases to which a DC voltage has been applied; calculate the phase resistance of the winding of the stator of the compressor according to the DC voltage and the current; determine a temperature of the winding of the stator according to the phase resistance; inject a current into the winding of the stator according to the difference between the determined temperature and a predetermined temperature, such that the heating power of the winding of the stator is a desired heating power.

According to an embodiment of the present disclosure, the controller may be configured to: determine the temperature of the winding of the stator according to the phase resistance, with reference to a table of correspondence between phase resistances and temperatures that is pre-stored in a frequency converter of the variable-frequency compressor.

According to an embodiment of the present disclosure, the controller may be configured to: detect a position of the rotor before injecting the current into the winding of the stator and inject the current into the winding of the stator according to the position of the rotor and the difference between the determined temperature and the predetermined temperature.

According to an embodiment of the present disclosure, the controller may be configured to: forcibly position the rotor in a predetermined position before injecting the current into the winding of the stator, and inject the current into the winding of the stator according to the predetermined position and the difference between the determined temperature and the predetermined temperature.

According to another aspect of the present disclosure, a method for operating a variable-frequency compressor is provided. The variable-frequency compressor includes: a compression unit, for compressing a medium entering the variable-frequency compressor; an electric motor, comprising a stator and a rotor, for driving the compression unit; and a controller. In the method, the controller adaptively controls a heating power of a winding of the stator according to the information of the variable-frequency compressor.

According to an embodiment of the present disclosure, the information of the variable-frequency compressor may include position information of the rotor, and the controller may control the heating power of the winding of the stator according to the position information of the rotor.

According to an embodiment of the present disclosure, the information of the variable-frequency compressor may include a phase resistance of the winding of the stator, and the controller may control the heating power of the winding of the stator according to the phase resistance of the winding of the stator.

According to an embodiment of the present disclosure, the controller may control the heating power of the winding of the stator according to a phase resistance of the winding of the stator and a position of the rotor.

According to an embodiment of the present disclosure, the step of controlling the heating power of the winding of the stator according to a position of the rotor may include: detecting the position of the rotor, and adjusting the amplitude of a current injected into the winding of the stator according to the position of the rotor, such that the heating power of the winding is a desired heating power.

According to an embodiment of the present disclosure, the step of controlling the heating power of the winding of the stator according to a position of the rotor may include: forcibly positioning the rotor if the rotor position is adjustable, such that the amplitude of a current injected into the winding of the stator causes the heating power of the winding to be a desired heating power.

According to an embodiment of the present disclosure, the step of forcibly positioning the rotor may include: forcibly positioning the rotor in a predetermined position, and injecting a current into the winding of the stator according to a heating current parameter corresponding to the predetermined position, such that the heating power of the winding is a desired heating power.

According to an embodiment of the present disclosure, the step of forcibly positioning the rotor in a predetermined position may include: forcibly positioning the rotor in a position that causes a current flowing through the winding of one phase in the stator to be substantially zero.

According to an embodiment of the present disclosure, the step of controlling the heating power of the winding of the stator according to a phase resistance of the winding of the stator may include: detecting a current flowing through the windings of two phases to which a DC voltage has been applied; calculating the phase resistance of the winding of the stator of the compressor according to the DC voltage and the current; determining a temperature of the winding of the stator according to the phase resistance; and injecting a current into the winding of the stator according to the difference between the determined temperature and a predetermined temperature, such that the heating power of the winding of the stator is a desired heating power.

According to an embodiment of the present disclosure, the step of determining a temperature of the winding of the stator according to the phase resistance may include: determining the temperature of the winding of the stator according to the phase resistance, with reference to a table of correspondence between phase resistance and temperature that is pre-stored in a frequency converter of the variable-frequency compressor.

According to an embodiment of the present disclosure, the method may further include: detecting a position of the rotor before injecting the current into the winding of the stator, and injecting the current into the winding of the stator according to the position of the rotor and the difference between said temperature and the predetermined temperature.

According to an embodiment of the present disclosure, the method may further include: forcibly positioning the rotor in a predetermined position before injecting the current into the winding of the stator, and injecting the current into the winding of the stator according to the predetermined position and the difference between said temperature and the predetermined temperature Embodiments of the present invention does not rely on a crankcase heating parameter alone to inject a current into the stator winding, but also takes into account information relating to the variable-frequency compressor such as rotor position and/or stator winding phase resistance in order to inject the current, thereby achieving adaptive control of crankcase heating and satisfying heating power requirements in different situations and different time periods.

BRIEF DESCRIPTION OF THE DRAWINGS

The above and other objectives, features and advantages will become clearer through the following description of embodiments of the present disclosure with reference to the drawings, in which.

DETAILED DESCRIPTION

Embodiments of the present disclosure are described below with reference to the drawings. However, it should be understood that these descriptions are merely exemplary, and do not necessarily limit the scope of the present disclosure. In addition, descriptions of well known structures and technologies in the field are omitted in the explanation below, to avoid confusing the concept of the present disclosure unnecessarily.

The terms used here are intended merely to describe specific embodiments, not to limit the present disclosure. The words "a", "one (type)" and "the", etc. used here should also include the meanings "multiple" and "multiple types of", unless clearly indicated otherwise in the context. In addition, the terms such as "comprise" and "include" used here indicate the presence of the feature, step, operation and/or component mentioned, but do not rule out the presence or addition of one or more other features, steps, operations or components All terms used here (including technical and scientific terms) have the meanings commonly understood by those skilled in the art, unless otherwise defined. It should be noted that the terms used here should be interpreted as having meanings consistent with the context of this specification and should not be interpreted in an excessively rigid way FIG. 1 is a schematic diagram showing a compressor according to an embodiment of the present disclosure.

Figure 1:
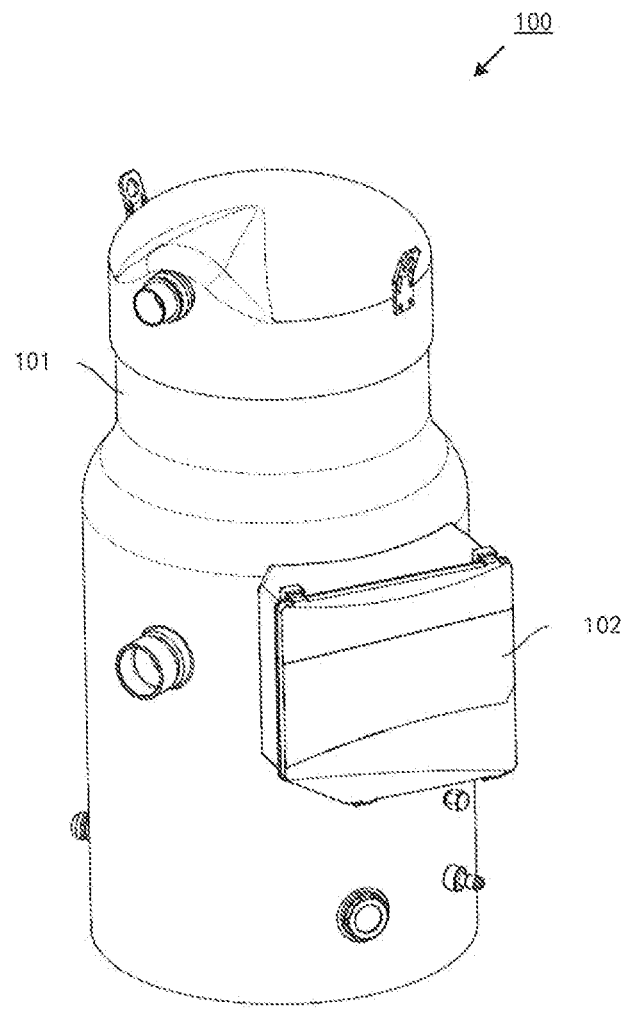
FIG. 1 is a schematic diagram showing a compressor according to an embodiment of the present disclosure.

As shown in FIG. 1, the compressor 100 according to this embodiment may include a shell 101. The shell 101 may be made of a hard material such as steel, etc., and has a space formed in the interior thereof for the purpose of accommodating components of the compressor 100 (not visible in FIG. 1 due to being accommodated in the shell 101), and may include a channel for a working medium flow through the compressor 100. The compressor componenets may comprise various components, for example a compression mechanism for compressing the working medium that enters it (e.g. the static scroll and orbiting scroll of a scroll compressor, etc.), an actuation mechanism for driving the motion of the compression mechanism to compress the working medium (e.g. an electric motor assembly, etc.), various sensors for monitoring the operating state of the compressor, and so on.

The electric motor may include a stator and a rotor. The stator may include a stator winding. When the electric motor is operating, an alternating current (AC) can flow into the stator winding, thereby generating a rotating magnetic field to enable the rotor to rotate. The rotor may include a rotor winding. The rotor can cut the magnetic field of the stator, which generates an induced EMF and current, and the rotor can further driven to rotate by a force caused by the rotating magnetic field. In some examples, the electric motor may for example be a three-phase AC electric motor.

In addition, the compressor 100 may further include an electrical box 102. The electrical box 102 may be mounted on a surface of the shell 101, and used to accommodate at least a portion of electrical components of the compressor 100, for example a control component of the compressor 100 such as a controller or microcontroller, a storage component, a power supply, etc.

Program code may be stored in the storage component, for execution by the control component in order to control the operation of the compressor 100.

Mechanical parts of the compressor 100 such as bearings and a piston require lubrication by lubricating oil. These lubricating oils can accumulate in an oil sump at the bottom of the compressor. The rotation of the compressor drives a shaft to rotate; the lowermost end of the shaft is immersed in the oil sump, and a hollow inclined hole may be provided in the shaft. Oil is sucked up by centrifugal suction of rotation, delivered to each area that requires lubrication, such as the piston. Inside the piston, the oil is discharged from the compressor together with refrigerant, finally returning together with the refrigerant back into the oil sump. The compressor 100 may provide a crankcase heating function, in order to control the temperature difference between the oil sump temperature and the ambient temperature, as well as to evaporate liquid refrigerant and thereby prevent excessive dilution of the oil.

Figure 5:
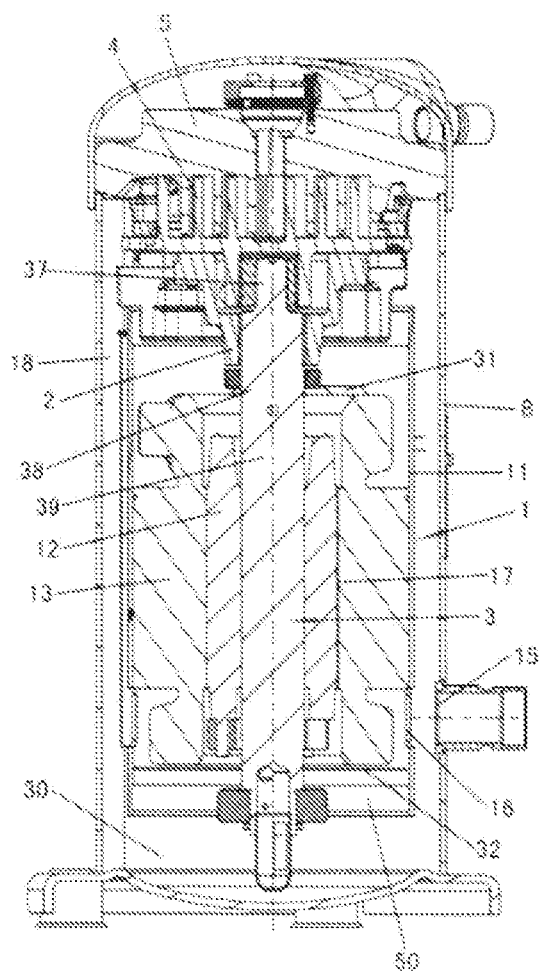
FIG. 5 is an exemplary structure of a scroll compressor according to an embodiment of the present invention.

According to an embodiment of the present disclosure as shown in FIG. 5, an exemplary structure of a scroll compressor is shown for better understanding of the compressor with a crankcase heating function. In this embodiment, the compressor includes a shell 8; an orbiting scroll 4 disposed in the shell 8, a fixed scroll 5 disposed in the shell 8, and an oil sump 30 disposed at the bottom of the shell 8 for accumulating lubricating oil. The orbiting scroll 4 and the fixed scroll 5 together form a compression mechanism.

The scroll compressor further includes: a housing 2 and a motor 1.

The housing 2 is configured to support the fixed scroll 5 and has a gas passage that extends through the housing 2 to the compression mechanism, for example a gas passage that extends axially through the housing 2 to the compression mechanism. The motor 1 is arranged below the housing 2 and comprises a rotor 12, a stator 13, a drive shaft 3 passing through the rotor 12 and connected to the rotor 12, a motor supporting tube 11. The drive shaft 3 is connected to the orbiting scroll 4, the motor support tube 11 is disposed inside the shell 8, the upper end of the motor support tube 11 is connected to the housing 2 and the rotor 12 and the stator 13 are disposed in the motor support tube 11. The motor support tube 11 is connected to the stator 13 for retaining the stator 13, the rotor 12 and the drive shaft 3 in the shell 8. The motor support tube 11 may be cylindrical and the scroll compressor may further include a closure 32 for closing the lower end of the motor support casing 11. A crankcase heating belt is normally positioned at the lower end of the shell 8, for example, it may surround the position of the shell 8 beneath the projection part 37 of the drive shaft 3 or may be at the position at the shell beneath a suction port 15. This is just and example, and the present disclosure is not limited to this scroll compressors only.

According to an embodiment of the present disclosure, the compressor 100 may be a variable-frequency compressor, and may therefore include a frequency converter (disposed in the electrical box 102 for example). The frequency converter can inject current into the winding of the stator, in order to realize this crankcase heating function. The frequency converter can control a heating power by controlling the current injected into the stator winding according to a crankcase heating parameter.

However, the injection of a controllable current does not mean the ouput of controllable heating power because the frequency converter will inject current into the winding of each phase (e.g. phases U, V and W in a three-phase scenario) according to the rotor position information at that moment. In the examples below, a three-phase scenario is described as an example for introduction convenience. However, the present disclosure is not limited to this.

Specifically, although the amplitude of a three-phase current is always a set value, i.e., $|Iu|+|Iv|+|Iw|=Iset$, different rotor positions will have different combinations of currents Iu, Iv and Iw for the three phases U, V and W. It can be seen from the heating power calculation formula $I^2R$ that a constant current amplitude Iset might produce different heating powers. Thus, when the heating function is used, an uncertain heating amount will be produced due to the change in the rotor position.

This uncertainty in the heating power or heating amount is explained below in the example shown in FIG. 2. In this example, suppose that the set value of the injected current Iset=20 A, and the winding resistance of each phase of the stator is $0.1\Omega$. In scenario (a) in FIG. 2, the rotor is in line with the direction of the winding of the phase injected with current in the stator (phase U in this example), while the windings of the other two phases (phases W and V in this example) are distributed symmetrically with respect to the rotor. In this case, the injected current Iu (=20 A) flows into the other two phases substantially equally. At this time, the heating power can be calculated as: $20^2 \times 0.1 + 10^2 \times 0.1 + 10^2 \times 0.1 = 60$ W. In scenario (b) in FIG. 2, the normal to the rotor is substantially in line with the direction of the winding of one phase in the stator (phase V in this example). In this case, the current flowing through this phase can be substantially zero. Substantially all of the current Iu (=20 A) injected from phase U flows through phase W. At this time, the heating power can be calculated as: $20^2 \times 0.1 + 20^2 \times 0.1 = 80$ W.

As can be seen, as the angle between the rotor and the stator varies, the distribution of the injected current among the windings of the different phases also varies, resulting in different heating powers. The scenario (a) in FIG. 2 shows the scenario with the minimum heating power, while the scenario (b) in FIG. 2 shows the scenario with the maximum heating power. When the rotor is at other positions, the heating power lies between the maximum heating power and the minimum heating power. The heating function may be started when the compressor stops rotating, i.e., when the rotor stops running, but the position at which the rotor stops can be random. Thus, even if the current injected into the stator is adjusted according to a heating current parameter, the actual heating power may still be different at different heating occasions.

According to an embodiment of the present disclosure, the heating power can be controlled according to the rotor position. For example, current is not injected into a stator winding solely according to the heating current parameter; the amplitude of the current injected into the stator winding can be adjusted according to rotor position in order to have a desired power (e.g., to make the heating power constant on every occasion). Alternatively or additionally, if the rotor position is adjustable (even if the compressor has stopped rotating), the rotor can be forcibly positioned (parked) in order to adjust the rotor position, such that the rotor position is the same on every occasion when the heating function is performed. The heating power can thus be a desired power obtained according to the injected current (e.g., the injected current can be constant on every occasion).

Figure 3:
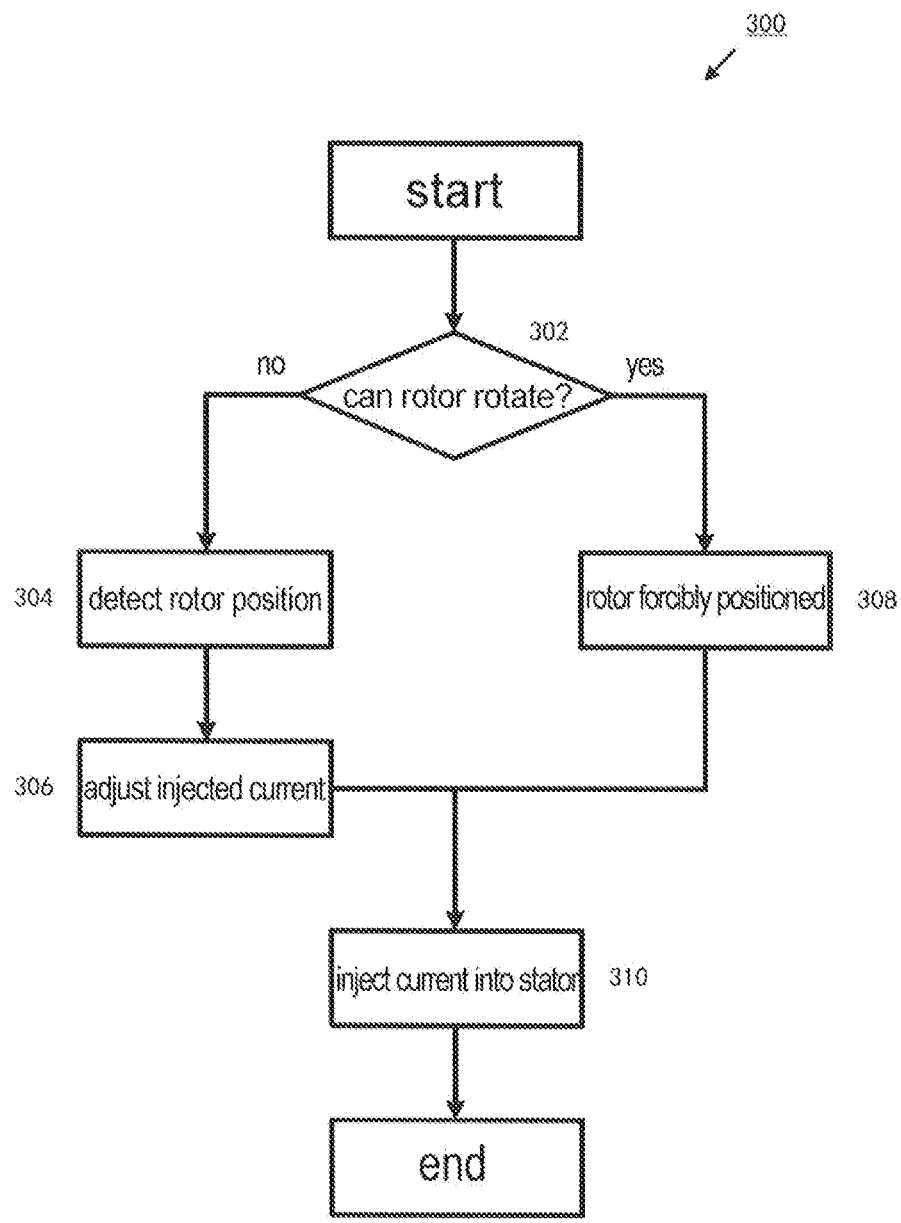
FIG. 3 is a flow chart showing a method for adaptive control of heating power according to an embodiment of the present disclosure.

FIG. 3 is a flow chart showing a method for adaptive control of heating power according to an embodiment of the present disclosure.

As shown in FIG. 3, the method 300 may include, in operation 302, determining whether the rotor can rotate when the compressor has stopped rotating.

If the rotor cannot rotate, the amplitude of the injected current can be adjusted according to the present position of the rotor. For example, in operation 304, the position of the rotor can be detected. According to an embodiment, the position of the rotor can be detected according to a built-in sensor in the compressor or by other method such as by using the salient pole effect in the motor. In operation 306, the distribution of current in the windings of different phases can be determined according to the detected rotor position, and the current that needs to be injected in order to achieve the desired power can thereby be determined. In operation 310, current can be injected into the stator windings based on the injected current determined, in order to achieve the desired power. For example, based on the injected current determined, the heating current parameter may be adjusted so as to inject a suitable current into the stator windings.

Figure 2A:
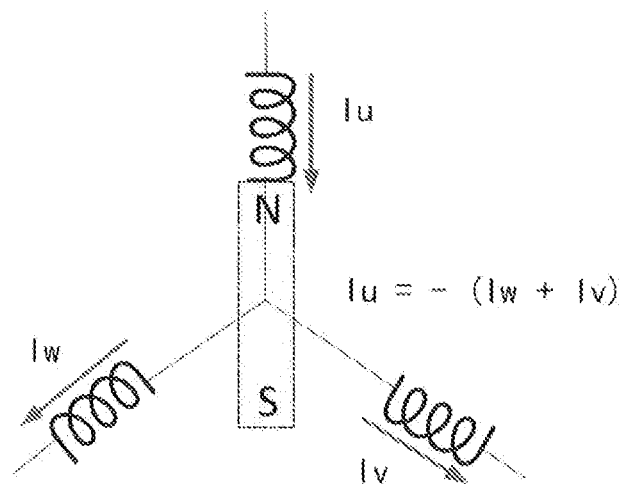
FIGS. 2a and 2b are examples showing the variation of current passing through stator windings with rotor position.
Figure 2B:
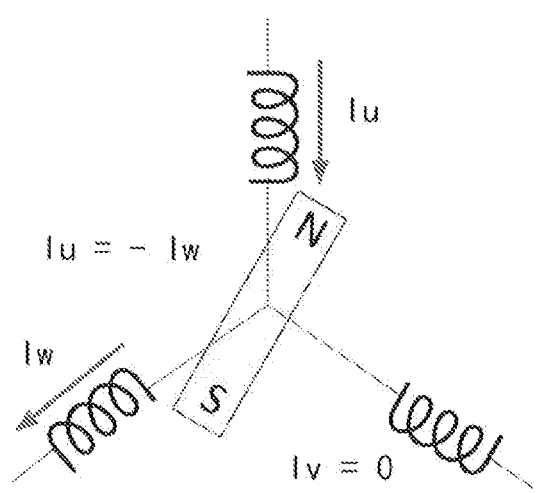

For example, in summer, the desired heating power is lower. For example, only 25 degrees Celsius is needed, and a heating power of 60 W may be required considering the temperature before heating. Thus, when the position of the rotor is detected as shown in FIG. 2 (a), in this example the current that need be injected can be determined as 20 A. Thus, the heating current parameter is adjusted so that the injected current is 20 A. In another example, the detected rotor position is between FIG. 2(a) and FIG. 2(b), and the injected current required is then less than 20 A if a heating power of 60 W is needed. In this case, the heating current parameter is adjusted so that the heating power achieved by the injected current is 60 W. In this way, the injection of current according to the rotor position is realized, in order to achieve the desired heating power.

Alternatively, if the rotor can rotate when the compressor is shut down, the rotor can be forcibly positioned in operation 308 in order to adjust the rotor position. As stated above, the rotor can be adjusted to a fixed position (relative to the stator), which can be predetermined, and this predetermined position corresponds to a predetermined heating current parameter. The above information and an algorithm for forcible positioning may be all stored in the frequency converter, and executed by the frequency converter. Thus, once the rotor has been forcibly positioned in the fixed position, a suitable current can be injected into the stator windings according to the predetermined heating current parameter, thereby achieving the desired heating power. According to an embodiment of the present disclosure, the rotor can be adjusted to the position shown in FIG. 2 (b), i.e., such that the current in the winding of one phase can be substantially zero (as stated above, in this situation, the same injected current can achieve a larger heating power). Then in operation 310, current may be injected into the stator windings, for example, a current of a preset value may be injected.

For example, in winter, the desired heating power is higher.

Accordingly, 45 degrees Celsius may be needed, and a heating power of 80 W may be required considering the temperature before heating. Thus, the rotor can be forcibly positioned in the position shown in FIG. 2(b), in which the power added is the maximum. According to the example above, if the injected current is still 20 A, a heating power of 80 W can be achieved. Thus, the heating current parameter is adjusted so that the injected current is 20 A. A current of 20 A is then injected into the stator. The desired heating power can likewise be achieved.

The above is merely an example. The rotor may be positioned in any position, as long as the heating current parameter is determined in that position and the injected current can then be adjusted to achieve the desired heating power.

It should be noted that although two control branches are shown in the flow chart of FIG. 3, this does not mean that the two branches are definitely executed separately; they may also be executed in combination. For example, in the case where the rotor is forcibly positioned, it is also possible to adjust the amplitude of the injected current, to achieve different heating powers.

It should be noted that expected heating powers may be different. For example, in the hot summer, the desired heating power may be relatively low; and in the cold winter, the desired heating power may be relatively high.

According to an embodiment of the present disclosure, by detecting the position of the compressor rotor and by adjusting the injected current automatically, the heating power is controllable; or by forcible positioning of the rotor, heating power can still be controllable when current is injected at a fixed position. The heating power is controllable and the heating function of the crankcase can be used more effectively, and the uncontrollable change of the heating power between high and low can be avoided, thus avoiding a situation where the heating power cannot be increased when a high power is required for heating and where the heating power is too high when a low power is needed for heating.

Figure 4:
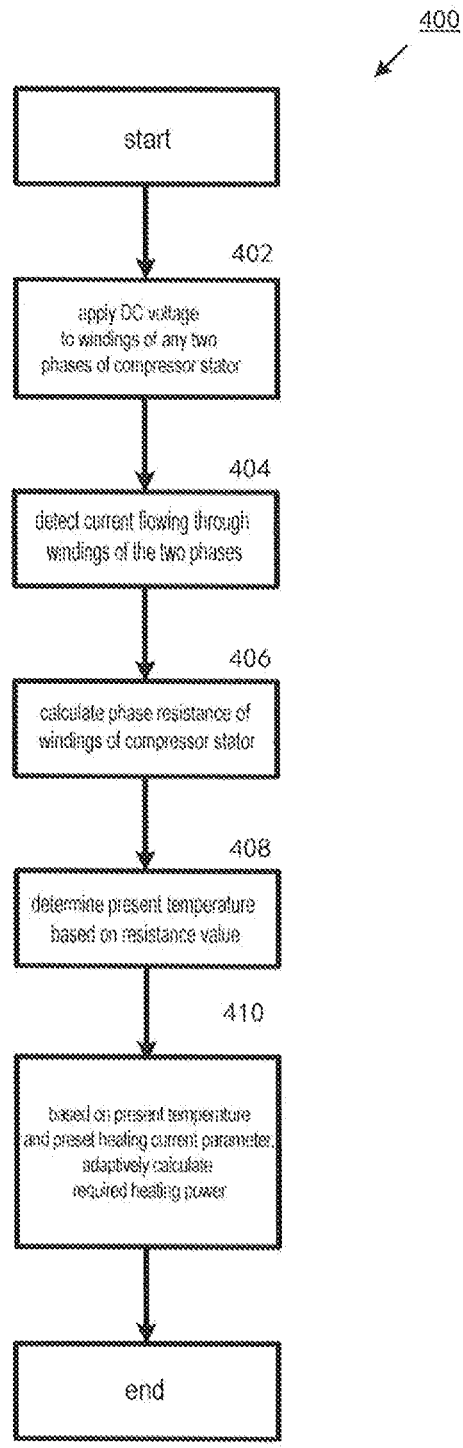
FIG. 4 is a flow chart showing a method for adaptive control of heating power according to another embodiment of the present disclosure.

FIG. 4 is a flow chart showing a method for adaptive control of heating power according to another embodiment of the present disclosure.

As shown in FIG. 4, the method 400 may include operations 402-410.

In operation 402, before heating is carried out, a DC voltage (e.g., 5%-20% of the rated voltage of the motor) is applied to the windings of any two phases in the compressor stator.

In operation 404, the current flowing through the windings of the two phases to which the DC voltage has been applied is detected.

In operation 406, based on the DC voltage applied in operation 402 and the current detected in operation 404, the phase resistance of the windings in the compressor stator is calculated. The value of the phase resistance of the stator windings is directly related to the present ambient temperature in the vicinity of the compressor, and the correspondence relation therebetween may be stored in the frequency converter in advance.

In operation 408, based on the calculated phase resistance in the compressor, the present ambient temperature is looked up in a resistance-temperature correspondence table that is pre-stored in the frequency converter.

In operation 410, based on the present ambient temperature and a preset heating current parameter for the crankcase, the current injected into the stator windings is adaptively controlled, to ensure that the heating power would be the desired heating power.

In an example, the preset heating current parameter corresponds to a preset (or desired) temperature of the crankcase; the current injected into the stator windings can thus be controlled according to the temperature difference between the present ambient temperature and the preset temperature corresponding to the preset heating current parameter.

For example, if the temperature difference is greater than 15°, the injected current is controlled to maximize the heating power; if the temperature difference is less than 3°, the injected current is controlled to minimize the heating power.

In an exemplary embodiment, it is possible to periodically calculate the phase resistance of the stator windings, to look up the ambient temperature, and to adjust the current injected into the stator whenever necessary according to the temperature difference between the looked-up ambient temperature and the preset temperature (or the preset temperature determined according to the preset heating current parameter). For example, if the present ambient temperature is relatively low and the temperature difference is greater, the maximum power can be used for heating; if the present ambient temperature becomes higher and the temperature difference has decreased, a low power can be used for heating.

In an embodiment, when three phases of currents are injected into the compressor and two of the three phases have equal currents, the heating power required is at its minimum; when two phases of currents are injected into the compressor, the heating power required is at its maximum. The heating power produced by any other mode of current injection lies between the minimum and the maximum, wherein the maximum power and minimum power differ by 25%.

Operations 402-410 in FIG. 4 can be performed iteratively, to achieve the desired heating power by multiple times of adjustment.

Alternatively, operations 402-410 may be performed once, so as to achieve the desired heating power directly from the present heating power.

As can be seen, with this mode of operation, it is possible to determine the temperature according to the value of the phase resistance in the variable-frequency compressor, to adjust the injected current according to the temperature difference between the ambient temperature and the desired temperature set by the user, and thereby to attain the required heating power, thus achieving the objective of adaptive power adjustment.

In another exemplary embodiment, the operation processes shown in FIGS. 3 and 4 can be used in combination.

For example, according to the temperature difference between the present ambient temperature and the preset desired temperature according to the operations shown in FIG. 4, current is injected subsequently supplemented by consideration of the rotor position in FIG. 3.

For example, if the temperature difference is 25°, the rotor can be positioned in the position of FIG. 2(b); in this case, the injection of current into the stator according to the heating current parameter can achieve a greater heating power. As the temperature difference which is periodically calculated decreases, the rotor can be gradually positioned in the position of FIG. 2(a), at which the minimum heating power can be achieved by injecting the same current. As another example, if the temperature difference is determined as being 10° according to the operations of FIG. 4 and the rotor position is detected, the heating current parameter is adjusted according to the rotor position and the temperature difference so as to adjust the injected current, and a lower heating power can be used for heating.

Embodiments of the present disclosure have been described above.

However, these embodiments are merely intended for illustration, not to limit the scope of the present disclosure. Although various embodiments have been described separately above, this does not mean that the measures in the various embodiments cannot be advantageously used in combination. The scope of the present disclosure is defined by the attached claims and their equivalents. Those skilled in the art could make various substitutions and amendments without departing from the scope of the present disclosure, and all such substitutions and amendments shall fall within the scope of the present disclosure.

What is claimed is:

1. A variable-frequency compressor, comprising:
   a compression unit, for compressing a medium entering the variable-frequency compressor;
   a motor, comprising a stator and a rotor, for driving the compression unit; and
   a controller, configured to adaptively control a heating power of a winding of the stator according to information of the variable-frequency compressor.

2. The variable-frequency compressor according to claim 1, wherein the controller is configured to:
   control the heating power of the winding of the stator according to a position of the rotor.

3. The variable-frequency compressor according to claim 2, wherein the controller is configured to detect the position of the rotor, and to adjust amplitude of a current injected into the winding of the stator according to the position of the rotor, and to make the heating power of the winding at a desired heating power.

4. The variable-frequency compressor according to claim 2, wherein the controller is configured to forcibly position the rotor if the rotor position is adjustable, and to make amplitude of a current injected into the winding of the stator enable the heating power of the winding to be a desired heating power.

5. The variable-frequency compressor according to claim 4, wherein the controller is configured to forcibly position the rotor in a predetermined position, to inject a current into the winding of the stator according to a heating current parameter corresponding to the predetermined position, and to make the heating power of the winding at a desired heating power.

6. The variable-frequency compressor according to claim 5, wherein the controller is configured to forcibly position the rotor in a position that causes a current flowing through a winding at one phase in the stator to be substantially zero.

7. The variable-frequency compressor according to claim 1, wherein the controller is configured to:
control the heating power of the winding of the stator according to a phase resistance of the winding of the stator.

8. The variable-frequency compressor according to claim 7, wherein the controller is configured to:
detect a current flowing through windings at two phases which a DC voltage is applied to;
calculate phase resistance of the winding of the stator of the compressor according to the DC voltage and the current;
determine a temperature of the winding of the stator according to the phase resistance;
inject a current into the winding of the stator according to the difference between said temperature and a predetermined temperature, and to make the heating power of the winding of the stator at a desired heating power.

9. The variable-frequency compressor according to claim 8, wherein the controller is configured to:
determine the temperature of the winding of the stator according to the phase resistance, with reference to a table of correspondence between phase resistances and temperatures that is pre-stored in a frequency converter of the variable-frequency compressor.

10. The variable-frequency compressor according to claim 8, wherein the controller is configured to: detect a position of the rotor before injecting the current into the winding of the stator, and inject the current into the winding of the stator according to the position of the rotor and the difference between said temperature and the predetermined temperature.

11. The variable-frequency compressor according to claim 8, wherein the controller is configured to: forcibly position the rotor in a predetermined position before injecting the current into the winding of the stator, and inject the current into the winding of the stator according to the predetermined position and the difference between said temperature and the predetermined temperature.

12. The variable-frequency compressor according to claim 1, wherein the controller is configured to:
control the heating power of the winding of the stator according to a phase resistance of the winding of the stator and a position of the rotor.

13. A method for operating a variable-frequency compressor, wherein the variable-frequency compressor comprises:
a compression unit, for compressing a medium entering the variable-frequency compressor;
an electric motor, comprising a stator and a rotor, for driving the compression unit; and
a controller,
wherein the method comprises:
controlling adaptively, by the controller, a heating power of a winding of the stator according to information of the variable-frequency compressor.

14. The method according to claim 13, wherein the step of adaptively controlling the heating power of the winding of the stator according to the information of the variable-frequency compressor comprises:
controlling the heating power of the winding of the stator according to a position of the rotor.

15. The method according to claim 14, wherein the step of controlling the heating power of the winding of the stator according to the position of the rotor comprises:
detecting the position of the rotor, and adjusting amplitude of a current injected into the winding of the stator according to the position of the rotor, in order to make the heating power of the winding at a desired heating power.

16. The method according to claim 14, wherein the step of controlling the heating power of the winding of the stator according to the position of the rotor comprises:
forcibly positioning the rotor if the rotor position is adjustable in order to make amplitude of a current injected into the winding of the stator enable the heating power of the winding to be a desired heating power.

17. The method according to claim 16, wherein the step of forcibly positioning the rotor in order to make the amplitude of the current injected into the winding of the stator enable the heating power of the winding to be a desired heating power, comprises:
forcibly positioning the rotor in a predetermined position and injecting a current into the winding of the stator according to a heating current parameter corresponding to the predetermined position, in order to make the heating power of the winding at a desired heating power.

18. The method according to claim 17, wherein the step of forcibly positioning the rotor in the predetermined position comprises:
forcibly positioning the rotor in a position that causes a current flowing through a winding at one phase in the stator to be substantially zero.

19. The method according to claim 13, wherein the step of adaptively controlling the heating power of the winding of the stator according to the information of the variable-frequency compressor comprises:
controlling the heating power of the winding of the stator according to a phase resistance of the winding of the stator.

20. The method according to claim 19, wherein the step of controlling the heating power of the winding of the stator according to a phase resistance of the winding of the stator comprises:
detecting a current flowing through windings at two phases which a DC voltage is applied to;
calculating the phase resistance of the winding of the stator of the compressor according to the DC voltage and the current;
determining a temperature of the winding of the stator according to the phase resistance; and
injecting a current into the winding of the stator according to the difference between the determined temperature and a predetermined temperature, in order to make the heating power of the winding of the stator at a desired heating power.

21. The method according to claim 20, wherein the step of determining the temperature of the winding of the stator according to the phase resistance comprises:
determining the temperature of the winding of the stator according to the phase resistance, with reference to a table of correspondence between phase resistances and temperatures that is pre-stored in a frequency converter of the variable-frequency compressor.

22. The method according to claim 20, further comprising:
- detecting a position of the rotor before injecting the current into the winding of the stator, and
- injecting the current into the winding of the stator according to the position of the rotor and the difference between the determined temperature and the predetermined temperature.

23. The method according to claim 20, further comprising:
- forcibly positioning the rotor in a predetermined position before injecting the current into the winding of the stator, and injecting the current into the winding of the stator according to the predetermined position and the difference between the determined temperature and the predetermined temperature.

24. The method according to claim 13, wherein the step of adaptively controlling the heating power of the winding of the stator according to information of the variable-frequency compressor comprises:
- controlling the heating power of the winding of the stator according to a phase resistance of the winding of the stator and a position of the rotor.

* * * * *